United States Patent

[11] 3,562,432

[72] Inventor Ova G. Gabbard
Mc Lean, Va.

[21] Appl. No. 594,921
[22] Filed Nov. 16, 1966
[45] Patented Feb. 9, 1971
[73] Assignee Communications Satellite Corporation
a corporation of Washington, D.C.

[54] SYNCHRONIZER FOR TIME DIVISION MULTIPLE ACCESS SATELLITE COMMUNICATION SYSTEM
22 Claims, 8 Drawing Figs.

[52] U.S. Cl. ........................................ 179/15; 325/4, 325/15SAT, 325/41
[51] Int. Cl. ........................................ H04j 3/06, H04b 1/00
[50] Field of Search ........................................ 325/4; 41, 15 (SAT); 179/15 (SYNC), 15 (AEC); 178/69.5; 343/200, 204

[56] References Cited

UNITED STATES PATENTS

| | | | |
|---|---|---|---|
| 3,418,579 | 12/1968 | Hultberg | 325/4 |
| 3,424,868 | 1/1969 | Saal | 179/15sync |

FOREIGN PATENTS

| | | | |
|---|---|---|---|
| 1,195,373 | 6/1965 | Germany | 179/15sync |

*Primary Examiner*—Robert L. Griffin
*Assistant Examiner*—Albert J. Mayer
*Attorney*—Sughrue, Rothwell, Mion, Zinn and Macpeak

ABSTRACT: This invention relates generally to time division multiple access satellite communication systems and, more particularly, to a synchronizer unit which controls the timing of burst transmissions such that transmissions originating at different earth stations interleave in the satellite without overlapping, thus permitting several transmitting stations simultaneously to use the satellite relay in such a communication system.

INVENTOR
O. G. GABBARD

BY Sughrue, Rothwell, Mion, Zinn & Macpeak
ATTORNEYS

SYNCHRONIZER FOR TIME DIVISION MULTIPLE ACCESS SATELLITE COMMUNICATION SYSTEM

A burst synchronizer unit which controls the burst transmission time of an earth station so that the burst reaches the satellite in its assigned time slot even though a substantial range rate exists between the earth station and the satellite. One earth station is designated a master station and the others are designated slave stations. Each station's burst contains a synchronizing signal or unique word identifying the station. Each station detects both the master unique word and its own unique word, called the local slave unique word, relayed from the satellite. The major components of the synchronizer unit are a correction rate circuit, a sync-loss detection circuit, an up-down error counter, a burst position control counter, a burst position control counter reset control, an acquisition control, a phase comparator, and a variable digital delay unit. The master unique word and local slave unique word are detected at the station to provide master and slave pulses. Correction rate circuit selects a pair of master and slave pulses from the same frame time every $(2T_d+a)$ seconds, where $T_d$ is the one way delay time between the station and the satellite and $a$ is a margin to provide for satellite movement and accuracy of electronic components. When an associated pair of master and slave sync pulses is detected, the master station sync pulse is delayed by the variable digital delay unit the known amount of time between the master and slave station time slots in the satellite. An associated pair is defined as a master sync pulse and local slave sync pulse both of which were contained in and selected from a single frame. The phase comparator then determines whether a phase difference exists between the delayed master and the local slave sync pulses. Any difference in phase is stored as an error in the up-down counter. The output of the up-down counter is fed to the burst position control counter reset control which functions to change the scale of the burst position control counter by plus or minus one bit for the number of time frames required to bring the slave sync and delayed master sync into time coincidence, thereby reducing the error stored in the up-down counter to zero. If the correction rate circuit fails to find an associated pair of master and slave sync pulses, the sync-loss detection circuit switches the correction rate circuit to a search mode to look for associated pairs of master and slave sync pulses in the immediately following frames. If sync loss continues for a predetermined time, the station transmitter is automatically disabled to prevent jamming of other bursts.

The initial acquisition control permits the scale of the burst position control counter to be changed from the normal N to selected number X for one counter cycle in order promptly to time the initial burst of a station desiring initial access to the satellite.

Other objects, features and advantages of the invention will be apparent from the following more particular description of preferred embodiments of the invention, as illustrated in the accompanying drawings.

In a satellite communication system which employs time division multiple access (TDMA), reliable and efficient burst synchronization is very important. Short bursts of transmitted information originating from different earth stations must enter predetermined time slots in the satellite transponder such that proper interleaving of the bursts occurs without overlap. Failure to obtain high synchronization accuracy will decrease communication efficiency or cause quality degradation in those parts of each burst which are susceptible to overlap with other bursts.

Figure 1:
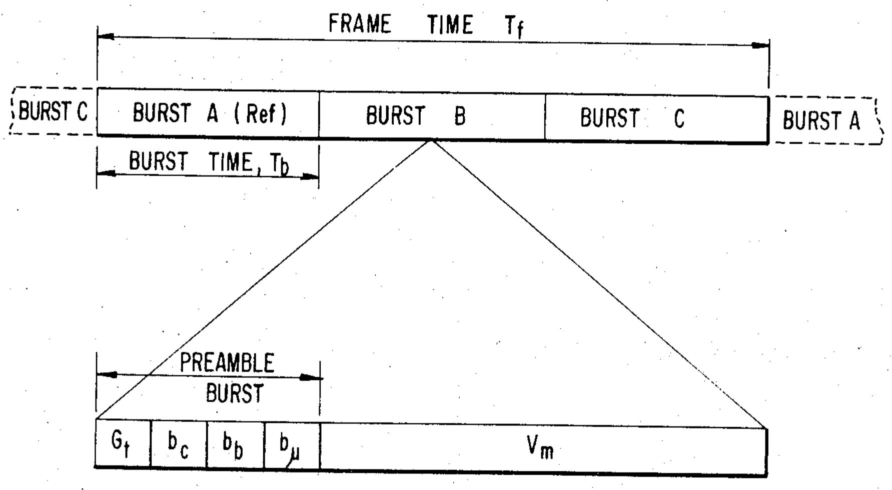
FIG. 1 is a schematic diagram of the TDM time frame of a three station time division multiple access satellite communication system.

Since absolutely perfect satellite orbits are not obtained in practice, there is always a range rate between an earth station and the satellite even for a synchronous satellite. For example, even though the "Early Bird" synchronous satellite is in a nearly perfect orbit, there is a peak range rate of 30 feet per second or about 20 miles per hour. As another example, consider a satellite in a medium altitude (12 hour period) perfectly circular orbit. Such a satellite has a peak range rate of 1500 feet per second or a 1,000 miles per hour. The range rate between an earth station and the satellite produces a continuously changing delay time for an RF signal traveling from the earth station to the satellite. The novel synchronizing unit of this invention compensates for this changing time delay to control the burst transmission time of an earth station so that its burst arrives in the station's assigned time slot in the satellite in spite of the range rate. A time frame $T_f$ as seen at the satellite contains a master or reference station burst and a number of other accessing bursts which are timed relative to the master burst. Any station can be designated the master station. The time frame format for a three station satellite communication system is shown in FIG. 1 where station A is designated the master station and stations B and C the two slave stations. The bit repetition rate is assumed to be 6.176 MHz or megabits per second. The time frame $T_f$ is chosen as 125 microseconds. The following table explains the symbols used in FIG. 1:

TABLE 1

| Symbol | Item Specified |
|---|---|
| $T_f$ | Frame Time Period |
| $T_b$ | Burst Time Period |
| $G_t$ | Guard Space Per Burst |
| $b_c$ | Carrier Recovery Time |
| $b_b$ | Bit Timing Recovery Time |
| bu | Unique Word (Station Code) |
| Vm | Information Carrying Bits Per Burst |

When a nontransmitting station desires initial access to the satellite, it transmits only the preamble bit (carrier recovery, bit timing recovery and the unique word) to the satellite. Using computer predicted time position, the preamble burst is aimed at the center of its assigned time slot in the satellite. The preamble burst enters somewhere within the assigned slot, because the burst time slot is made longer than the sum of all uncertainties. Once the preamble burst is placed in the time slot, the preamble bits are moved to the beginning of the time slot and the information bits are added. After initial acquisition, the novel synchronizer unit of this invention maintains the station burst in its assigned time slot in spite of the range rate of the satellite relative to the earth station. Initial acquisition is accomplished by means of a novel technique disclosed and claimed in a copending application filed Nov. 16, 1966 by John G. Puente, entitled "Acquisition Technique for Time Division Multiple Access Satellite Communication System", and assigned to the assignee of this application.

Figure 2:
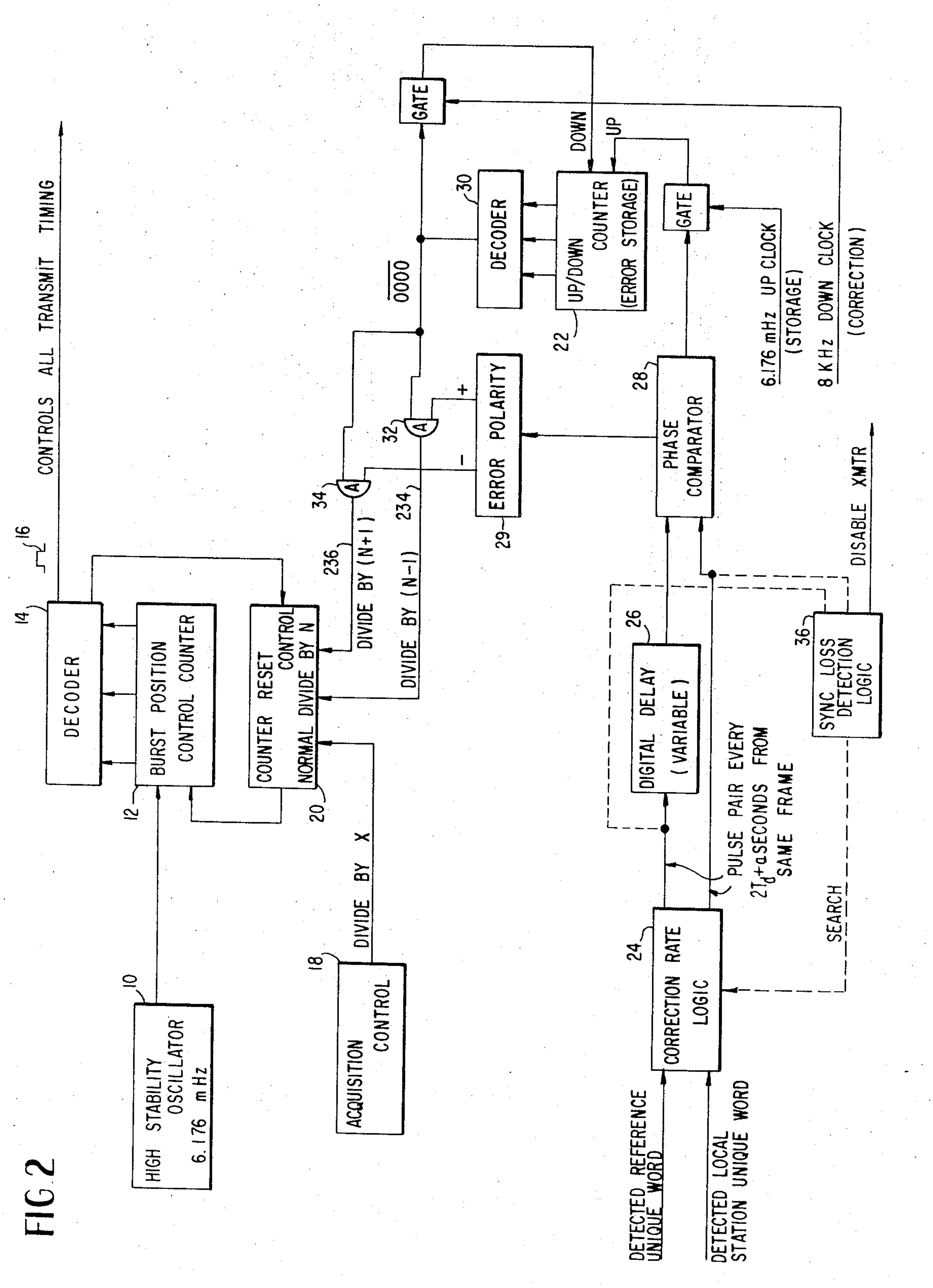
FIG. 2 is a block diagram illustrating all of the components of a preferred embodiment of the novel synchronizing unit.

Let us now refer to the block diagram of the synchronizer unit illustrated in FIG. 2. A high stability oscillator operating at 6.176 MHz. steps a burst position control counter BPCC 12. The normal scale of counter 12 is N = 772 thereby producing every 125 microseconds on the output of decoder 14 an ON pulse 16 which initiates the transmission of the station burst by turning on the station channel sampler. However, for initial acquisition of the satellite, an initial acquisition control 18 operates through a counter reset control 20 to change the scale of the BPCC counter 12 to X for a single cycle. The basic initial acquisition approach is to calculate by computer what the phase should be between a received master unique word and the TRANSMIT pulse from the output of decoder 14. The scale X of BPCC counter 12 which will correct the phase of the predicted value is then determined from available correction charts.

Once the preamble bursts have been semiautomatically placed in the time slot assigned to the station, and these preamble bursts have been relayed by the satellite to the earth stations which sent them, the time position of the preamble burst may be compared with its associated master station burst and automatic phase corrections can be made by means of the novel synchronizing unit of this invention. The word "associated" is used with reference to master station and slave station bursts to designate that these bursts occur in the same time frame.

Normal operation of the burst synchronizer illustrated in FIG. 2 will now be described. The high stability oscillator 10 in cooperation with the BPCC counter 12 and decoder 14 controls all timing related to the transmit side of a local station in the TDMA system. Decoder 14 turns the station transmitter on to start the burst, provides timing to other subsystems which generate the burst, and turns off the transmitter at the end of the burst. The counter normally divides by N = 772, thus producing a burst every 125 microseconds. However, if a burst position, or phase, error has been measured and stored in an up-down counter 22, the burst position control counter 12 may be commanded to divide by (N−1) or (N+1) for enough time frames to correct the stored error, after which the counter is returned to its normal scale of N. This operation directly changes the phase of the burst being transmitted relative to the master station burst. Storing the phase error at high speed and correcting by slightly changing the length of each frame time over a longer time interval solves interface problems with a continuous output/input PCM equipment. No single frame is changed in length by more than one bit period (160 nanoseconds). In determining the phase error existing at a certain time, a correction rate logic circuit 24 first chooses a pair of associated (contained in the same frame) master and local slave station unique word detection pulses from the large number which are arriving each $(2T_d+a)$ seconds. Then, the master station detection pulse is delayed by $nT_b$ in a variable digital delay unit 26. n is the number of time slots or burst times separating the master station burst and the local station burst in the TDM time frame. $T_b$ is the length of a burst. Consequently, when the local station is in synchronism, the delayed master detection pulse and the local station detection pulse should arrive at the same time at the input to a phase comparator 28. Any difference in phase at phase comparator 28 is the exact error which is then stored in up-down counter 22. The output of an Error Polarity circuit 29 associated with comparator 28 determines which of the gates 32 and 34 should be enabled so that the scale of BPCC counter 12 may be changed to advance or retard, respectively, the burst time of the local station transmission by one bit per frame until the error is reduced to zero. Changing the setting of the digital delay 26 moves the local station burst relative to the reference burst, thus permitting change in guard time or selection of any burst time slot in which to operate.

The unit illustrated in FIG. 2 might be described as a special high-resolution, digital-phase-lock-loop with real and varying time delay in the loop. The system is stable and produces no overshoot when the reciprocal of the correction rate is longer in time than the total loop delay $2T_d$ which is approximately 270 milliseconds. Since time $2T_d$ lapses during one roundtrip to the satellite, it is clear that the results of a synchronization correction applied at an earth station at time $t_0$ cannot be seen until time $(t_0+2T_d)$. Thus, any synchronization subsystem which is smoothing rather than predicting in nature cannot make a correction operation more often than every $2T_d$ seconds.

The correction rate circuit 24 selects an associated pair of master and local slave station detected unique word pulses every $(2T_d+a)$ seconds where $a$ is a margin to provide for satellite movement and accuracy of the components at the station. If circuit 24 fails to find an associated pulse pair, a sync-loss detection circuit 36 switches the correction rate circuit 24 to a "search" mode which causes the correction rate circuit 24 to look for associated pulse pairs in each frame rather than only once every $(2T_d+a)$ seconds. If sync loss continues for a predetermined time, sync-loss detection circuit 36 automatically disables the station transmitter to prevent jamming of other station bursts.

Figure 3:
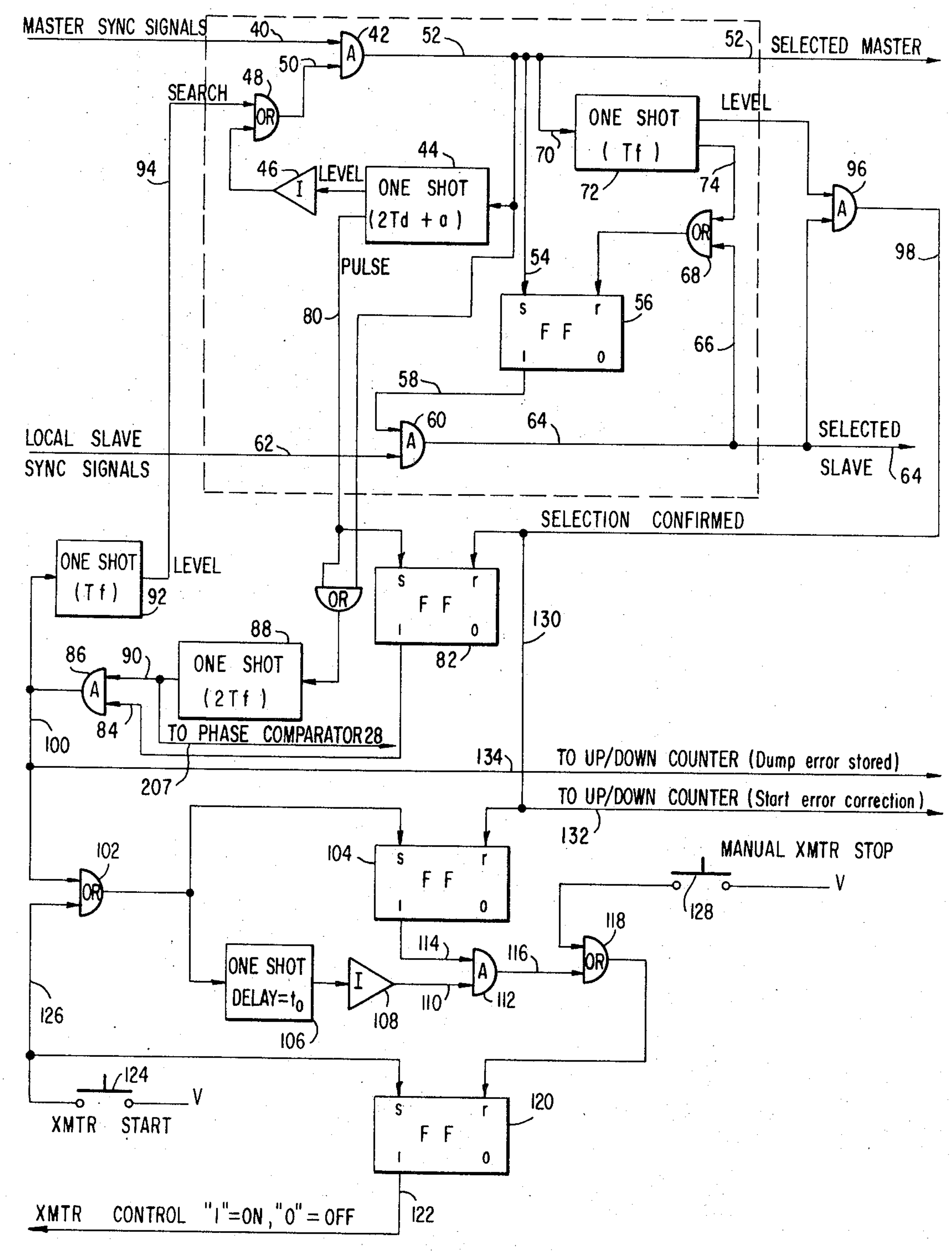
FIG. 3 is a logic diagram of the correction rate circuit and the sync-loss detector circuit.

FIG. 3 is a block diagram of the logic of correction rate circuit 24 and sync-loss detection circuit 36.

The inputs to correction rate circuit 24 come directly from the local station unique word or synchronizing signal detector (not shown) and are very fast rise time pulses (10 nanoseconds) which specify the received time position of the master burst and the local slave burst. These detected master and local slave pulses are arriving at the frame rate of 8 kHz. The time position separation from a master to a slave pulse in $(nT_b \pm e)$ where the local slave station transmits the $n$th burst, $T_b$ is the burst length, and $e$ is the synchronization error which must be corrected. Correction rate circuit 24 functions to choose a pair of master and slave pulses from the same time frame every $(2T_d+a)$ seconds.

The detected master station sync pulse is applied to one input 40 of an AND gate 42. Let us assume that $(2T_d+a)$ time has passed since the last output from AND gate 42, then an integrating oneshot multivibrator 44 will have just fallen to its low state. An integrating oneshot multivibrator has zero recovery time and remembers the last input even if the circuit was in a high state at the time of the last input. Consequently, the output of inverter 46 is high so that the output of an OR circuit 48 and the other input 50 of AND gate 42 are also high. Consequently, the next arriving master pulse on input 40 passes through AND gate 42 to reset single shot 44 to the high state, thereby lowering the output of inverter 46 and disabling AND gate 42 for the next $(2T_d+a)$ seconds. The selected master sync signal on the output 52 of AND gate 42 is fed via a conductor 54 to the set S input of a flip-flop 56, thereby setting the flip-flop and enabling the input 58 of another AND gate 60. Assuming that a slave pulse on input conductor 62 follows the selected master pulse by $(nT_b \pm e)$ seconds, this slave pulse will pass through AND circuit 60 and appear on the output conductor 64, thereby becoming the selected slave detected unique word or synchronizing signal.

The selected slave pulse on conductor 64 is fed via another conductor 66 through an OR circuit 68 to reset flip-flop 56, thereby inhibiting the AND gate input 58 so that all succeeding local slave signals on input 62 are blocked from output conductor 64 until the next master pulse is selected.

The selected master pulse on conductor 52 is fed via another conductor 70 to trigger a single shot multivibrator 72 which has a delay or period of $T_f$ = 125 microseconds. Consequently, at the end of one frame time $T_f$, single shot 72 will time out to produce a pulse on output conductor 74. This pulse passes through OR circuit 68 to reset flip-flop 56. This action insures that AND gate 60 is closed at the end of the selected time frame whether or not an associated master and slave pulse pair were found within the same selected time frame. It is this action which insures that the selected pair of master and slave pulses are from the same time frame. If no slave pulse passes through AND gate 60 in the time frame $T_f$ during which gate 60 was opened, the sync-loss detection circuit 36 will place the system in a SEARCH mode as discussed below.

The action of the correction rate circuit 24 as just described will repeat every $(2T_d+a)$ seconds if the proper master and slave sync signal are arriving on input conductors 1 and 62, respectively. The rate $1/(2T_d+a)$ is defined as the correction rate of the burst synchronizer unit illustrated in FIG. 1. This rate may be adjusted by changing the delay or time period of the integrating signal shot multivibrator 44. This adjustable feature allows the synchronizer unit to be used with satellites in a variety of orbits.

The purpose of the sync-loss detection circuit 36 is to (1) determine when there are no master sync pulses arriving on input conductor 40, (2) determine when there are no slave sync pulses arriving on input conductor 62, and (3) determine when a slave pulse is not found in the same frame with a selected master pulse. If any one or more of these three conditions are found, sync-loss detection circuit 36 must take one or more of the following actions:

1. Place the correction rate circuit 24 in a SEARCH mode to search for an associated pair of master and slave sync pulses every time frame instead of once each correction rate time.
2. Return from SEARCH mode back to normal operation when the first associated pair of master and slave pulses is found during SEARCH.
3. If SEARCH continues for a period of time $T_k$ approaching that which would cause burst overlap in the satellite, disable the local station transmitter.

Let us consider the three modes of operation of the sync-loss detection circuit 36.

MODE I: There are no master sync pulses arriving on input conductor 40.

For this condition, the integrating single shot multivibrator 44 will stay in the low state, thus enabling input 50 of AND gate 42 until a master sync signal is found. The first master signal found will pass through AND gate 42, thereby initiating action to choose an associated slave pulse as previously described with the normal operation of the correction rate circuit 24. If a master pulse is not found in $T_k$ seconds, MODE III is entered.

MODE II: A selected master sync pulse exists, but no slave pulse was found in the same time frame, or no slave sync pulses are arriving on input conductor 62.

The sync-loss detection circuit 36 will detect this condition and place the correction rate circuit 24 in SEARCH mode by the following action. When single shot 44 falls to the low state in selecting the master pulse, the pulse produced on conductor 80 is applied to set S input of a flip-flop 82 to set the flip-flop to enable the input 84 of an AND gate 86. The pulse on conductor 80 also triggers an integrating single shot multivibrator 38 which has a delay or timing period of $2T_f$. During the delay period, the conductor 90 is at a low level, but at the end of the delay $2T_f$, a pulse appears on conductor 90. Since it has been assumed that no slave pulse was selected, flip-flop 82 will not have been reset when the pulse appears on the output of single shot 88. Therefore, this pulse will pass through AND gate 86 to trigger another single shot 92 having a timing period or delay of one frame time $T_f$. During this time $T_f$, the output conductor 94 of single shot 92 is high and produces a SEARCH signal which passes through OR circuit 48 to enable for one frame time the input 50 of AND gate 42, thus selecting a single master sync pulse.

If now an associated slave pulse is found on conductor 62, the SEARCH is completed and both inputs of AND circuit 96 will be high to produce on conductor 98 a pulse which is applied to the reset R input of flip-flop 82 to reset the flip-flop.

The circuit is then returned to the normal correction rate mode. If an associated slave pulse is not found, additional SEARCH cycles will continue to look for associated pairs of master and slave station sync pulses. If an associated slave pulse is not found within time $T_k$, MODE III is entered.

MODE III: An associated pair of master and slave sync pulses have not been found, and no sync correction has been made within $T_k$ seconds.

The sync-loss detection circuit 36 will turn off the local station transmitter to prevent jamming of other bursts if this condition exists. It will be recalled that when searching for associated pairs of master and slave sync pulses in normal operation, integrating single shot multivibrator 44 falls to a low state to send a pulse through conductor 80 to set flip-flop 82 and to trigger integrating single shot 88. If an associated pulse pair is not found, a pulse passes through AND circuit 86 to initiate SEARCH mode. Furthermore, this same pulse passes via a conductor 100 through an OR circuit 102 to set a flip-flop 104 and also trigger a single shot 106 having a delay or timing period equal to $T_k$. If an associated sync pulse pair is not found within $T_k$ seconds, flip-flop 104 will not have been reset by the output of AND gate 96 at the time that single shot 106 times out. When single shot 106 times out, its output falls to a low state thereby producing a high state on the output of inverter 108 thus enabling the input 110 of an AND gate 112. Since flip-flop 104 is still set, the other AND gate input 114 is also high, thereby producing a pulse on the AND gate output conductor 116. This pulse passes through an OR circuit 118 thus removing the transmitter control signal of the set output conductor 122 of flip-flop 120. In other words, the station transmitter is now disabled. Once flip-flop 120 is reset, it must be manually set by depressing a switch 124 to turn on the transmitter. The depression of switch 124 also applies a pulse via a conductor 126 and OR circuit 102 to again set flip-flop 104 and trigger single shot 106 so that, if proper synchronization is not established within the next $T_k$ seconds, the station transmitter will again be disabled.

The transmitter may be manually disabled at any time by depressing switch 128. This applies a voltage pulse through OR gate 118 to reset flip-flop 120. Transmitter ON and OFF indicator lamps may be connected to the 1 and 0 outputs, respectively, of flip-flop 120. A sync loss indicator lamp may be connected to the 1 output of flip-flop 104.

Two auxiliary functions are also performed by the sync-loss detection circuit 36. If an associated master and slave sync pulse pair is found during normal operation or during SEARCH mode, a confirmation signal from the output of AND gate 96 is applied via conductors 98, 130, 132 to the error storage input conductor of up-down counter 22. Up-down counter 22 does not take any action to change the scale of the burst position control counter 12 until the confirmation signal is received via the conductor 132.

The second auxiliary function is to transmit to the up-down counter 22 via a conductor 134 a DUMP signal from the output of the AND gate 86 if a proper selection of associated master and slave pulses was not made. The DUMP signal prevents action from being taken on any false phase measurements which might have been made during a period of loss of synchronization.

Figure 4:
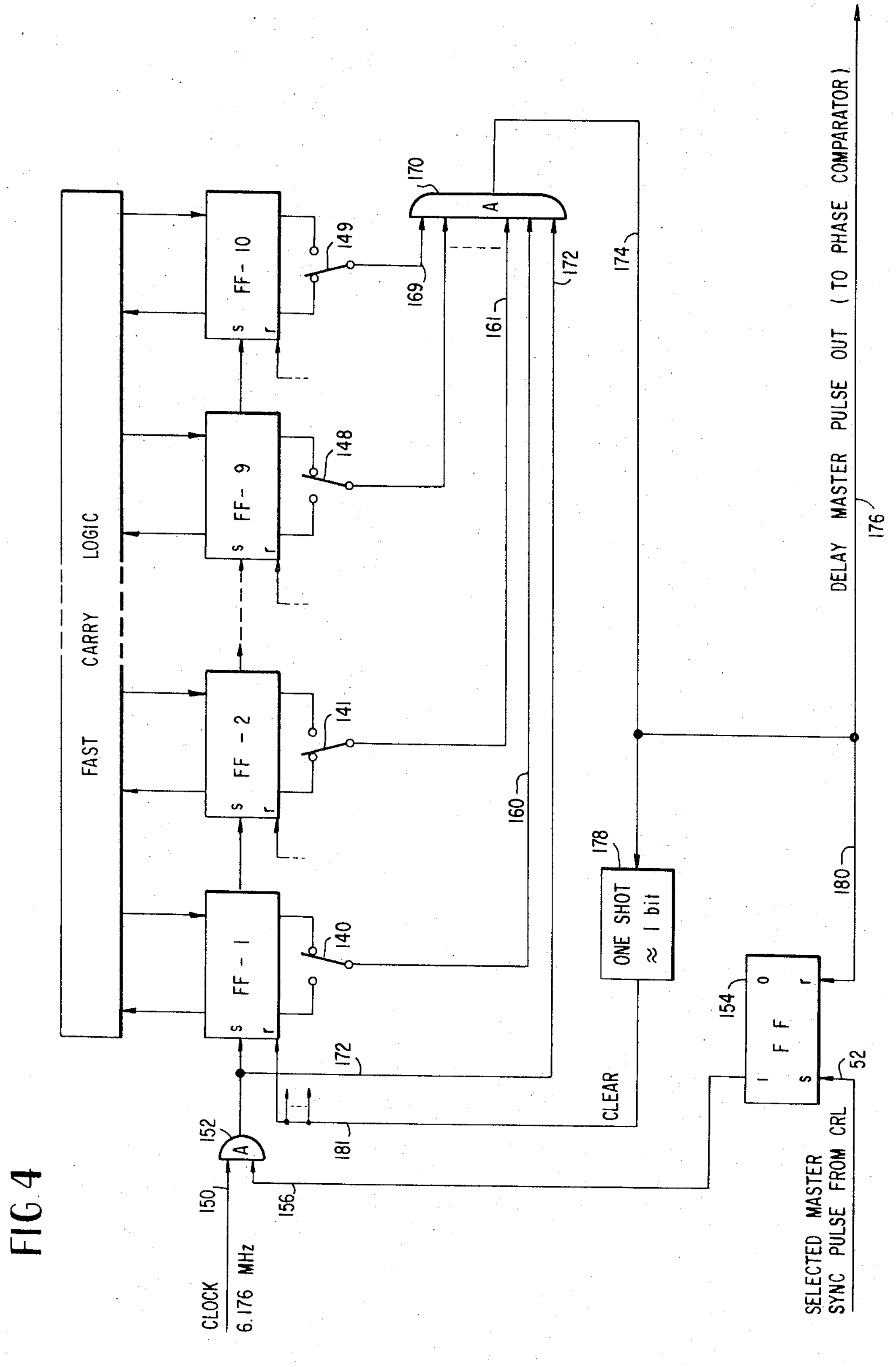
FIG. 4 is a logic diagram of the digital delay unit.

The digital delay unit 26 is illustrated in FIG. 4. Selected master sync pulses from the correction rate circuit 24 are applied via conductor 52 to digital delay unit which functions to produce delayed master sync pulses at its output. The amount of delay is adjustable from 0.243 microseconds (one bit) to 165.742 (1023 bits) by appropriately setting the 10 switches 140, 141...148, 149. The digital delay unit is normally set for $nT_b$ where the unit is located in an earth station which transmits the $n$th burst in the satellite time frame. $T_b$ is the average burst length including guard time.

The delaying action of unit 26 is accomplished as follows. The 6.176 MHz local clock pulses are always present on the input 150 of an AND gate 152. In the standby condition, flip-flops FF1, FF2...FF10 are all reset. A selected master sync pulse arrives on input conductor 52 and sets a flip-flop 154 whose 1 output enables the other input 156 of AND gate 152. Consequently, clock pulses begin to pass through AND gate 152 to the input of the counter formed by the flip-flops FF1, FF2...FF10, so that the flip-flops start counting at the 6.176 MHz rate. When flip-flops FF1...FF10 reach the 1 or 0 states previously selected on switches 140—149, the corresponding inputs 160, 161...169 of an AND gate 170 are simultaneously in a high state. Consequently, the next clock pulse from the output of AND gate 152 is fed via a conductor 172 through AND gate 170 to be fed via conductor 174 to an output conductor 176 which is connected to the input of phase comparator 28. The pulse on output conductor 176 is the delayed master sync pulse. This same pulse is applied via conductor 174 to the input of the single shot multivibrator 178 having a timing period equal to one bit. This pulse is also applied via a conductor 180 to reset flip-flop 154, thereby disabling AND gate 152 and stopping the flow of clock pulses into the counter. The output pulse from single shot 178 is applied via a conductor 181 to the reset R inputs of all the flip-flops FF1—FF10 to reset the entire counter. Therefore, the input master sync pulse applied to the conductor 52 has been in effect delayed according to the setting of switches 140—149, and the delay unit is now ready for the next master sync pulse input.

As an example of a specific delay, assume that a delay of (45.580±0.081) μs is desired. If the delay is set at X bits, the input will be delayed [(X+1)(0.162)+(0.081)±0.081]μs. The ±81 nanoseconds assumes the input master pulse phase is random relative to the 6.176 MHz clock phase and thus represents the 162 ns resolution of the delay unit. The 81 ns is added since it represents the mean of the 162 ns uncertainty region. The extra full bit of delay is the inherent delay in the counter logic. If the switches are set to X bits, the (X+1) th input clock pulse is the actual output. So, if a delay of (45.580±0.081)μs is desired, (X+1)=45.499μs, and X is 280 bits. In this case, switches 144, 145 and 148 would be thrown to the 1 side of their associated flip-flops, thereby representing the numbers 8, 16, and 256 respectively, which totals 280. All other switches would be thrown to the 0 side of their respective flip-flops. Any delay within the limits 0.243 ≤ DELAY ≤ 165.742μs can be setup using the same procedure.

Figure 5:
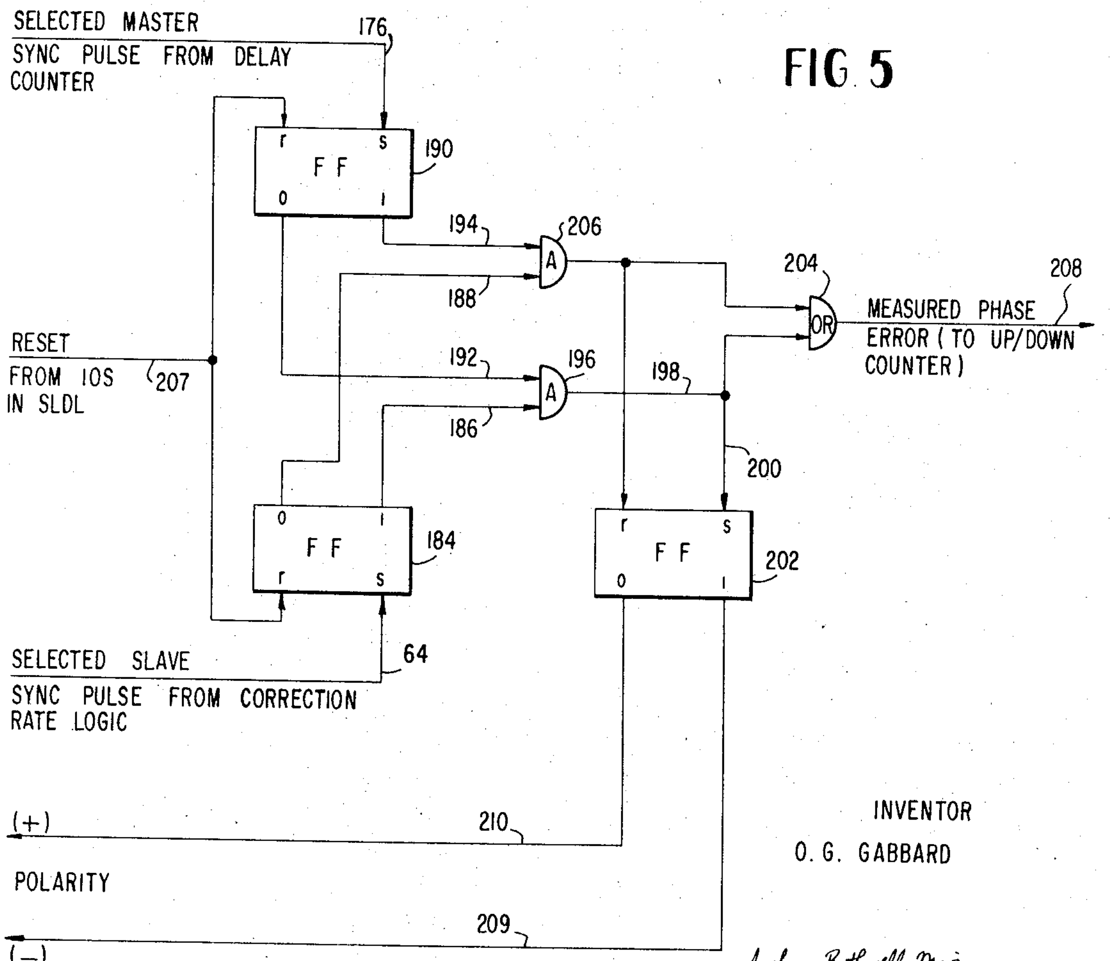
FIG. 5 is a logic diagram of the phase comparator.

FIG. 5 is a logic block diagram of phase comparator 28. The phase comparator accepts a delayed selected master sync pulse from the output conductor 176 of the digital delay unit 26 and a selected slave sync pulse directly from the output conductor 64 of the correction rate circuit 24. Ideally, these inputs are exactly in phase, and the phase comparator would produce no output. In practice, there is a phase error and the phase comparator will measure this error, determine its polarity, and send this information to the up-down counter 22.

Let us assume that a slave sync pulse arrives on conductor 64 before a delayed master pulse occurs on conductor 176. This pulse relationship is considered the negative (−) phase error condition which means that the slave burst is too close to the preceding burst, and the burst position control counter 12 must divide by (*n*+1) for an appropriate number of cycles to move the slave burst away from the preceding burst. The phase comparator will send to the up-down counter 22 a high state on conductor 208 for this high state exists for a time corresponding to the phase or time difference between the delayed master and slave sync pulses. The high state representing a negative error remains on conductor 208 until the next succeeding phase comparison is made. Conductor 208 is connected to up-down counter 22.

The details of the operation of the phase comparator follow. The slave sync pulse arriving on conductor 64 sets a flip-flop 184 to produce a high state on conductor 186 but a low state on conductor 188. Flip-flop 190 remains in the reset state, and therefore a high state exists on conductor 192 and a low state on conductor 194. Since both inputs to AND gate 196 are high, an output appears on conductor 198 which is fed via conductor 200 to set or confirm the setting of a flip-flop 202. A set or 1 output of flip-flop 202 produces the negative polarity signal on output conductor 209.

Simultaneously, the high state from AND gate 196 passes through an OR circuit 204 and continues as the phase error signal on output conductor 208.

When the delayed master sync pulse arrives on conductor 176 it sets flip-flop 190, thereby disabling input 192 to AND 196. This action drops conductors 198 and 208 to the low state, thus ending the phase error output. There is no output from AND gate 206 since the input on conductor 188 was already low because flip-flop 184 was set. Flip-flop 202 will not change state, but will continue to send a negative polarity signal to the up-down counter until the next phase measurement.

Approximately 250 microseconds after the master pulse arrives, a pulse from the output of the integrated single shot multivibrator 88 (FIG. 3) will arrive on conductor 207, thereby simultaneously resetting flip-flops 184 and 190, which action produces no outputs from either AND gate 206 or 196. The phase or synchronizing error has therefore been measured and sent with a negative polarity signal to the up-down counter, and the phase comparator is now ready for the next input.

The positive (+) phase error occurs when the delayed master sync pulse arrives before the slave sync pulse. The operation of comparator is quite similar for this case. However, no flip-flop 184 is set first, thus resetting flip-flop 202 to produce on conductor 210 a high state representing a positive polarity. The phase error signal is produced on conductor 208 as previously described.

Figure 6:
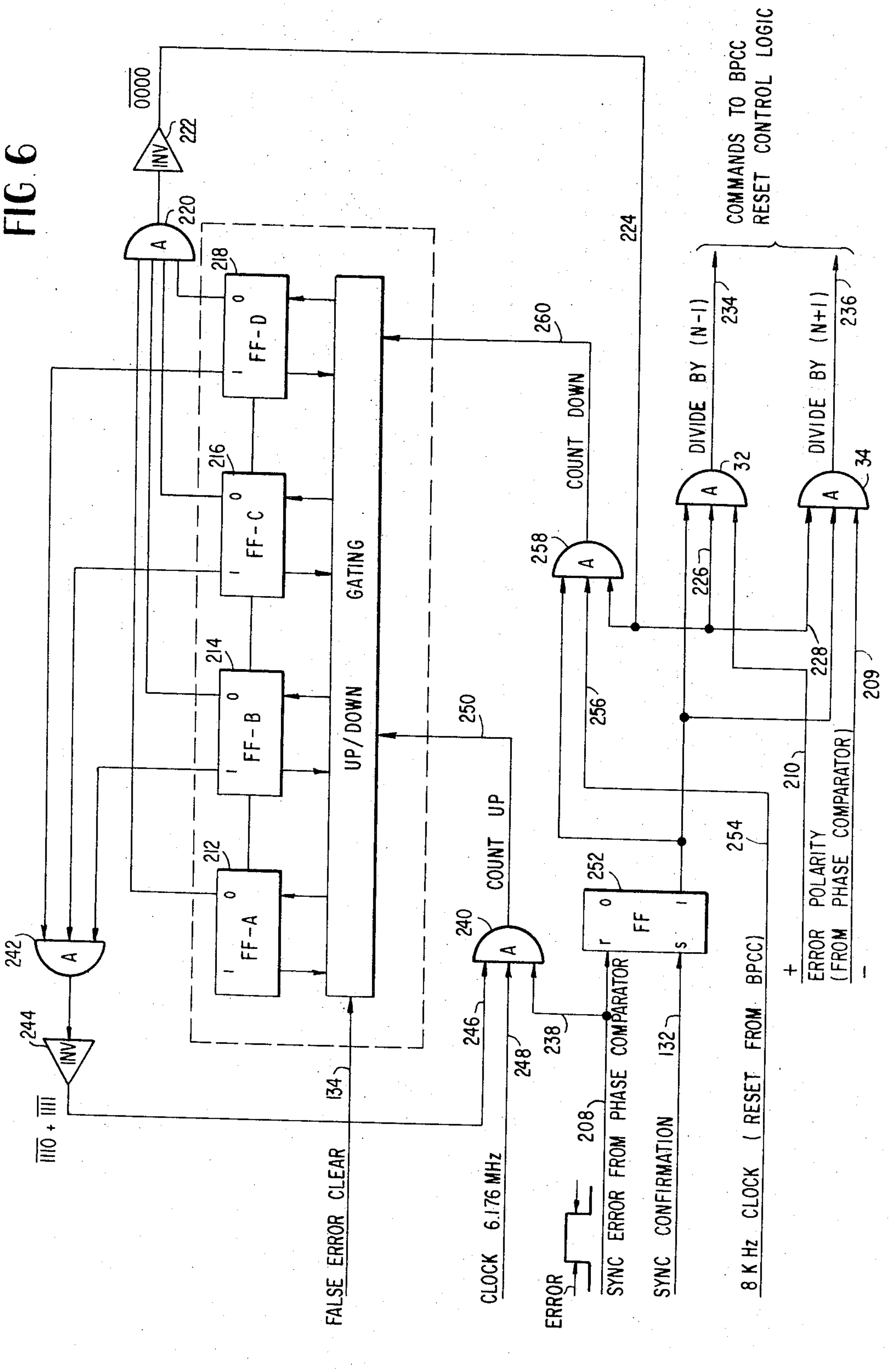
FIG. 6 is a logic diagram of the up-down error counter.

The logic diagram of up-down counter 22 is illustrated in FIG. 6. The up-down counter accepts as an input the sync error signal produced by phase comparator 28, stores this error at high speed (6.176 MHz) and corrects for the error in 162 ns increments at low speed (8 KHz.) by sending appropriate signals to the burst position control counter reset control 20.

The operation of the up-down counter will now be described. Assume that the up-down counter storage elements 212, 214, 216 and 218 are all in 0 or reset output states representing an output 0000. In this case, all four inputs of an AND gate 220 are high so that the output of the AND gate is high, but the output of the inverter 222 is low, i.e. The NOT ZERO ($\overline{0000}$) condition is not met. The low output of inverter 222 is fed via a conductor 224 to the inputs 226 and 228 of AND gates 32 and 34, respectively, which are also illustrated in FIG. 2. The output conductors 234 and 236 are therefore low and no command signals are received by the BPCC counter reset control 20, and the BPCC 12 operates normally, i.e. has a scale of N or divides by N, N = 772 in the example chosen.

Now let us assume that phase comparator 28 has completed a phase error measurement and transmitted this error via the conductor 208 to the up-down counter. This error pulse is applied to the input 238 of an AND gate 240. Since all of the flip-flops 212—218 are in their 0 state, the output of AND gate 242 is low and the output of inverter 244 is high, thereby enabling another input 246 of AND gate 240. The 6.176 MHz clock pulses are applied to the third input 248 of AND gate 240. The clock pulses will therefore appear on conductor 250 as a train of count-up pulses. For example, if the phase error were 324 ns, 2 pulses would pass through AND gate 240. If the error were 2.42μs or greater, 15 pulses would pass through AND gate 240. Up-down counter flip-flops 212—218 will count the number of input pulses on conductor 250 up to 15. When the counter elements reach the 1110 state, the output of AND gate 242 will go high, the output of inverter 244 will go low, thereby disabling AND gate 240. This acts to keep the flip-flops 212—218 from being "overrun" which would produce false error storage.

The measured phase error is now stored. At the beginning of storage, the error signal on conductor 208 also resets a flip-flop 252. A confirmation signal from the sync-loss detection circuit 36 appears on conductor 132 to confirm that the stored error is true and will set flip-flop 252. Setting of this flip-flop permits shifting to the count-down mode. The condition of the count of flip-flops 212—218 is NOT ZERO ($\overline{0000}$), therefore, the output of inverter 222 will be high. Furthermore, either a positive polarity signal will appear on conductor 210 or a negative polarity signal will appear on conductor 209. Consequently, all three inputs of either AND gate 32 or AND gate 34 will be high to produce an output on either conductor 234 or 236. At no time will the three inputs to both AND gates be high.

A high state on the output conductor 236 of AND gate 34 impresses upon the burst position control counter reset control 20 the command to divide by (N+1). Similarly, a high state on the conductor 234 on the output of AND gate 32 commands the reset control to divide by (N−1). Each time the burst position control counter 14 divides by (N−1) or (N+1) the resulting reset output pulse arrives on a conductor 254 as fed via input 256 through AND gate 258 to appear on conductor 260 as a count-down pulse which in turn is applied to the up-down counter. Each pulse to conductor 260 reduces the error stored in the up-down counter by one bit. This action continues until the entire error is read out of the counter flip-flops 212—218, i.e. the state of 0000 is reached. The output of AND gates 32 or 34 falls to the low state, and the burst position control counter 12 returns to the normal scale of N. The up-down counter logic is now ready for the next input from the phase comparator on conductor 208.

A phase comparison is made each ($2T_d+$) seconds. For a 6 hour satellite, ($2T_d+$) is approximately 100 milliseconds, and for a synchronous satellite ($2T_d+$) is 300 milliseconds. 100 milliseconds represents 800 time frames 125 microseconds long. Since a maximum of 15 bits can be stored in the up-down counter, and one bit of error correction is placed in each frame at the transmit side of the station, only 15 frames are required to make the maximum allowable error correction. It follows that the up-down counter will always be at the 0000 state ready to store a phase error for each output of the phase comparator.

If false error is stored by the up-down counter false correction commands will not be impressed upon the burst position control counter reset control 20. The fallacy of the stored error will be determined by the sync-loss detection circuit, and no confirmation signal will be sent via conductor 132 to set flip-flop 252. Instead, the DUMP signal on conductor 134 will be applied to the up-down counter to reset the counter flip-flops 212—218 to the 0000 state.

Figure 7:
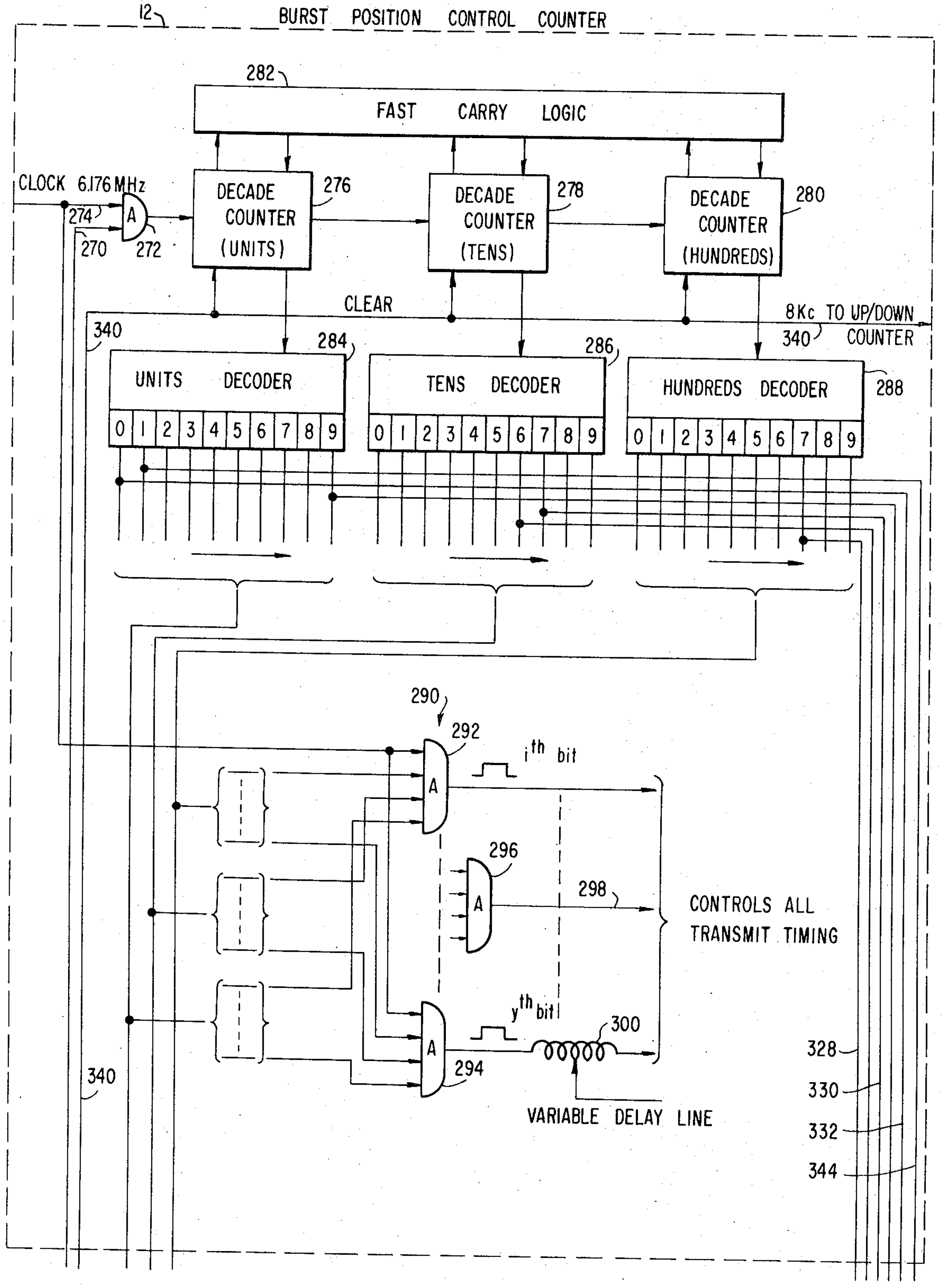
FIG. 7 is a logic diagram of the burst position control counter.

The burst position control counter 12 is illustrated in FIG. 7. The functions of BPCC 12 are (1) to provide timing control signals for all operations on the transmit side of the TDMA system, (2) to accomplish automatic time position or phase control of all transmit timing outputs by means of electronic commands from interconnecting subunits for the purpose of maintaining normal synchronization, and (3) to accomplish large but accurate one-time phase shifts by means of externally applied manual commands for accomplishing initial sync acquisition. In effect, the BPCC 12 forms the transmitted bursts and controls the time position of these bursts such that proper interleaving in the satellite occurs. The operation of the BPCC 12 and the circuits used to control it is described below.

The normal divide-by-N operation of the BPCC will now be explained. Let us assume that a high level appears on the input 270 of AND gate 272. Therefore, the 6.176 MHz clock pulses applied to the input 274 pass through AND gate 272 and counting of these pulses proceeds in decade counters 276, 278 and 280. Parallel operation of all decades is accomplished by means of a fast carry logic circuit 282. All positions of the three decade counters 276, 278 and 280 are being uniquely decoded by corresponding decoders 284, 286 and 288. One output of each decoder is fed to four input AND gates 290. The number of gates 290 required depends upon the number of control signals used in burst generation. Two of these AND gates 292 and 294 are illustrated. With such an arrangement, any time relative to the time when all decade counters were in the 0000 state and which is a multiple of one bit can be generated at will from the output of these AND gates. For example, if it is desired to turn on the local station transmitter at 56.509 microseconds from the 0000 state, we would choose a count *i* of 349 bits. Each bit is 162 nanoseconds; (349) (162) equals 56.509 microseconds. One of the AND gates 290, e.g. AND 296, would have one of its four inputs wired to the 3 output of decoder 288, another wired to the 4 output of decoder 286, and another wired to the 8 output of decoder 284 The fourth input of each AND gate is the 6.176 MHz clock pulse. Shortly after the 348th pulse passes through AND gate 272, the three decoder inputs to AND gate 296 will be simultaneously high, and will remain so for one bit time. During the bit time, clock pulse number 349 will arrive at the fourth input to AND gate 296 and will appear on output conductor 298 as a TRANSMIT pulse to turn on the local station sampler and initiate the burst transmission. No clock pulse other than number 349 will pass through AND gate 296 during a single cycle of BPCC 12. If it is desired to initiate the transmit time between the two integer bit times, the output of a four-input AND such as AND 296 may be passed through a variable delay line such as delay line 300 having a maximum delay of one bit or 162 nanoseconds.

Even though the decoders 284, 286 and 288 have a maximum of 1000 combination outputs, only as many AND gates 290 as are necessary to control all the transmit timing are required. Furthermore, two such AND gates and a flip-flop may be connected to produce a control signal which is several bits wide, if it is desired.

In normal operation when phase corrections are not being made, the BPCC reset control 20 causes the BPCC 12 to recycle every 772 input pulses, thereby producing periodic output timing controls from each of the gates 290 every 125.000 microseconds, i.e. exactly the frame time $T_f$. Bursts are therefore sampled and transmitted every 125 microseconds normally. If the BPCC reset control causes the BPCC 12 to divide (N+1)=73 for *y* time frames, phase of the (*y*+1) th bursts would have moved (*y*) (162 ns) relative to the initial phase. Each of these *y* frames would be 125.162 microseconds long. However, following frames until the next phase correction would be 125 microseconds. Similar reasoning for the (N−1) =771 case produce transmitted burst phase corrections in the opposite direction by producing *y* frames of length 124.838 microseconds. A one-time command causing a single frame to be X bits long where 3 is less than or equal to X is less than the equal to 999 can be entered via the acquisition control 18. Thus, a single phase correction can place the burst phase in the calculated position relative to a received master burst for the purpose of initial sync acquisition. The circuits used to accomplish the (N+1), (N−1) and X controls are discussed below.

Figure 8:
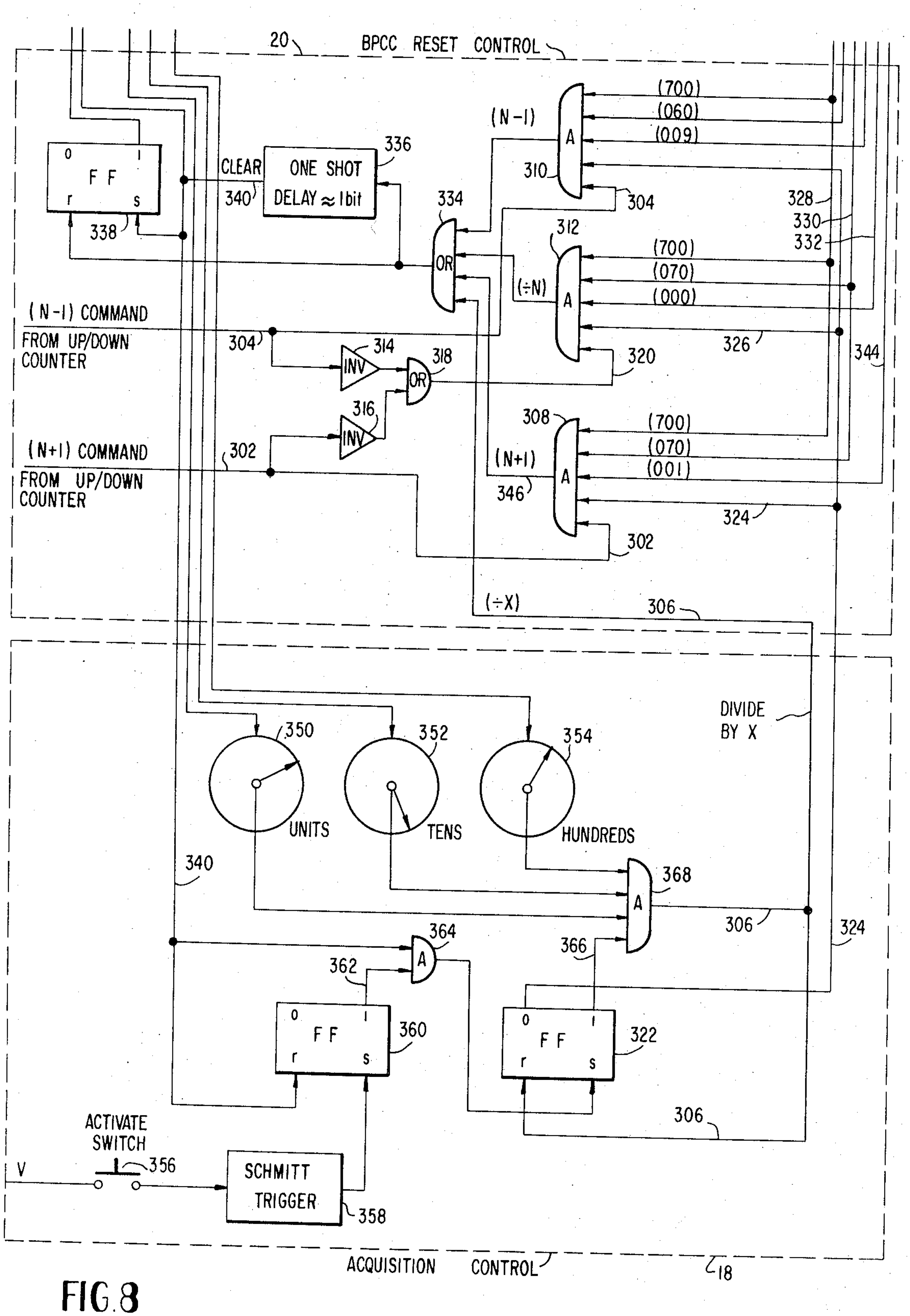
FIG. 8 is a logic diagram of the burst position control counter reset control and the acquisition control.

The logic diagram of the BPCC reset control 20 is shown in FIG. 8. The operation of the reset control will be described for each of three modes.

MODE I: Output control which causes the BPCC to divide by N. Assume that (N+1), (N−1) and X commands are not impressed on the reset control. Consequently, conductors 302, 304 and 306 are at low logical levels. Therefore, at least one input for both AND gates 308 and 310 is low, and no output will be obtained from the gates. AND gate 312 will pass the appropriate output control signal in the following manner.

The outputs of both inverters 314 and 316 will raise the output or OR circuit 318 and thereby raise the input 320 of AND gate 312. Since acquisition has not been initiated, flip-flop 322 will be in the reset state and the conductor 324 will be high. Consequently, the input 326 of AND gate 312 is high. The remaining inputs of AND gate 312 are the decoded outputs 700, 070 and 000 arriving on conductors 328, 330 and 332, respectively, from BPCC 12. It follows that shortly after the 770th pulse passes through AND gate 272 into the decades 276, 278 and 280, that these conductors 328, 330 and 332 will go simultaneously high to produce an output from AND gate 312.

This output passes through an OR circuit to trigger a one bit single shot 336 and reset a flip-flop 338. Resetting flip-flop 338 causes the input 270 of AND gate 272 to go low and block the clock pulses from the BPCC 12. The one bit delay of single shot 336 causes a pulse to appear on conductor 340 in phase, or nearly so, with the 772*d* clock pulse. The pulse on conductor 340 resets the decades 276, 278 and 280. The pulse on conductor 340 also sets flip-flop 338 thereby reenabling AND gate 272 to permit clock pulses to be fed to the BPCC. The 773*d* clock pulses causes the first count in the new cycle of the BPCC and thus is really the first clock pulse of the new cycle. By this same action, the BPCC recycles every N = 772 input pulses.

MODE II: Output control which causes BPCC to divide by (N+1) or (N−1).

Either an (N+1) or (N−1) command but not both will be received from the up-down counter when a phase correction of the BPCC is to be made. Since the (N−1) command is essentially the same as an (N+1) except for the positive or negative sense of the correction, we will describe in detail only the operation of the (N+1) command. Assume that an (N+1) command appears on conductor 236, i.e. conductor 236 is high, and conductors 304 and 306 are low. The high on conductor 236 and the high which will come from the reset output of flip-flop 322 on conductor 324 enable the two lower inputs of AND gate 308. AND gates 312 and 310 will be disabled by the low states on conductors 234 and 320. When BPCC 12 reaches count 771, conductors 328, 330 and 344 will go high and AND gate 308 will produce an output on conductor 346. As already explained, the resulting output from OR gate 334 will trigger single shot 336 and reset flip-flop 338 so that a clear pulse will appear on conductor 340 on the 773d clock pulse. The 774th clock pulse will be the first clock pulse for the next cycle and the BPCC has divided by (N+1)=773.

The same type of reasoning will produce a divide by (N−1) = 771 if an (N−1) instead of an (N+1) command had been given.

Since the BPCC clear pulse on conductor 340 is the 8 KHz. count-down clock for the up-down counter, the timing of the (N+1) and (N−1) commands will be such that these commands are not changing during any reset period. This insures that the number of bits of correction impressed upon the BPCC is exactly the number originally stored by the up-down counter.

MODE III: Divide by X – acquisition control.

Operation in this mode is very similar to the (N+1) mode except that the gating to determine when the BPCC is in the (X−2) state and generation of the subsequent control signal is passing through OR circuit 334 are accomplished by the acquisition control 18. Single shot 336 and flip-flop 338 control the BPCC such that it is reset on the count of X. AND gates 308, 310 and 312 are inhibited by a low state on the conductor 324 in the acquisition control. This insures that normal dividing cannot take place when a divide by X operation has been initiated. The acquisition control 18 is also illustrated in FIG. 8. The control operates as follows. Assume that BPCC 12 is dividing by N, (N+1), or (N−1). It has been determined by calculation that the BPCC should divide by X for one cycle in order to correct the first transmission timing for initial entry of the burst preamble into the satellite time slot assigned to the station. The number (X−2) would be entered on the dials 350, 352 and 354 (This two bit offset is peculiar to acquisition control actually built). The activating switch 356 is then depressed to set through a Schmitt trigger 358 a flip-flop 360. The 1 output of flip-flop 360 enables input 362 of an AND gate 364 so that the next clear pulse on conductor 340 from single shot 336 passes through AND gate 364 and sets flip-flop 322. The 1 output of flip-flop 322 raises the input 366 of AND gate 368. When the BPCC reaches (X−2), this fact will be transmitted through the dial switches 350, 352, and 354. An output will be produced from AND gate 368 since all four of its inputs are now high. The resulting pulse on conductor 306 will clear the BPCC on the Xth clock pulse.

The clear pulse on conductor 340 which passed through AND gate 364 to set flip-flop 322 also resets flip-flop 360. The output of AND gate 368 also resets flip-flop 322. These actions insure that only one cycle of divide-by-X exists for a single depression of activate switch 200.

It can be seen that X could be any number between 3 and 999; therefore, it follows that positive phase corrections as large as 227 bits or 36.76 microseconds or negative corrections of 769 bits or 124.5 microseconds can be made. This band is greater than the 125 microsecond frame time and, therefore, a single command will place the BPCC in any desired phase.

While the invention has been particularly shown and described with reference to preferred embodiments thereof, it will be understood by those skilled in the art that the foregoing and other changes in form and details may be made therein without departing from the spirit and scope of the invention.

I claim:

1. A synchronizer for a time division multiple access orbital satellite communication system wherein plural earth stations transmit signal bursts to an orbiting satellite relay station to be relayed thereby to earth stations, each transmitting station being assigned a time slot in the satellite time frame, each station's transmission including a synchronizing signal, one of said earth transmitting stations being designated a master station and the others being designated slave stations, and each slave station including detector means for detecting master synchronizing signals and said slave station's synchronizing signals relayed from said orbiting satellite relay station to provide corresponding master and slave synchronizing pulses, respectively said synchronizer comprising:

a. a correction rate circuit for normally selecting an associated pair of synchronizing pulses at correction times occuring once every $(2T_d+a)$ seconds, where $T_d$ is the time for a signal burst to travel from said slave station to the satellite and $a>0$, an associated pair of synchronizing pulses being defined as a master synchronizing pulse and a slave synchronizing pulse which occur in the same frame time;

b. comparing means coupled to said correction rate circuit for comparing the phases of an associated pair of synchronizing pulses;

c. means coupled to said comparing means for controlling the time at which said slave station transmits; and d. synchronization loss detector means coupled to said correction rate circuit for detecting the absence of either one of an associated pair of synchronizing pulses at one of said correction times.

2. A synchronizer as defined in claim 1 wherein said synchronization loss detecting means comprises means for causing said selecting means in said correction rate circuit to search for an associated pair of synchronizing pulses in successive frame times when an associated pair of pulses is not found at a correction time.

3. A synchronizer as defined in claim 2 wherein said synchronization loss detecting means comprises means for disabling the earth station transmitter when a predetermined number of successive frame times pass without a selection of an associated pair of master and slave synchronizing pulses.

4. A synchronizer as defined in claim 1 wherein said signal bursts contain information bit signals and further comprising:

a. delay means coupled between said correction rate circuit and said comparing means for delaying a selected master pulse for a time interval equal to the number of time slots between the master station and the time slot assigned to said slave station, whereby a time slot may be variable in both length and position within the frame, said comparing means further comprising:

b. means for generating an error signal corresponding to the difference in phase between said selected slave pulse and the delayed selected master pulse.

5. A synchronizer as defined in claim 4 wherein said transmission time controlling means further comprises digital control means coupled to said comparing means and responsive to said error signal for adjusting said slave station's transmission time one bit per frame for successive frames until said error signal is zero.

6. A synchronizer as defined in claim 5 wherein said digital control means further comprises:

a. a burst position control counter coupled to said transmission time controlling means for initiating transmission of said slave station's burst;

b. a reversible counter for storing said error signal; and c. a burst control counter reset circuit coupled between said burst position control counter and said reversible counter for determining the scale of said burst control counter.

7. A synchronizer as defined in claim 6 wherein the normal period of said burst control counter is one frame time.

8. A synchronizer as defined in claim 7 wherein said digital control means further comprises:

a. means responsive to a phase difference of one polarity to decrease the period of said burst control counter by one bit period and responsive to a phase difference of the opposite polarity to increase the period of said burst control counter by one bit period.

9. A synchronizer as defined in claim 8 further comprising means for changing the period of said burst control counter to any desired value for only one counter cycle and then returning said burst control counter to said normal period.

10. A synchronizer for a time division multiple access orbital satellite communications system wherein plural earth stations transmit signal bursts to an orbiting satellite relay station to be relayed thereby to earth stations, each transmitting station being assigned a time slot in the satellite time frame, each station's transmission including a synchronizing signal, one of said earth transmitting stations being designated a master station and the others being designated slave stations, and each slave station including detector means for detecting master synchronizing signals and said slave station's synchronizing signals relayed from said orbiting satellite relay station to provide corresponding master and slave synchronizing pulses, respectively, said synchronizer comprising:

a. means for comparing a master synchronizing pulse and a slave station synchronizing pulse occurring in the same frame time, said comparing means comprising:
   1. delay means coupled to said detecting means for delaying said master synchronizing pulse for a time interval equal to the number of time slots between the master station's time slot and the time slot assigned to said slave station; and
   2. means for producing an error signal dependent upon the phase difference between said slave synchronizing pulse and said delayed master synchronizing pulse; and b. means for controlling the time at which said slave station transmits comprising:
   1. counter means for initiating the transmission of a burst by said slave station once during each frame time; and
   2. storage means for storing said error signal and for changing the period of said counter until said error signal is zero, thereby changing said slave station's transmission time so that its burst appears in its assigned time slot.

11. A synchronizer as defined in claim 10 wherein said counter means is a burst position control counter, and said storage means changes said period each frame for successive frames by an amount less than the total phase difference until said slave station's burst appears in its assigned time slot.

12. A synchronizer as defined in claim 11 wherein said bursts consist of bit signals and wherein said storage means changes said period one bit per frame for successive frames.

13. A synchronizer as defined in claim 10 further comprising:

a. a correction rate circuit for normally selecting an associated pair of synchronizing pulses at correction times occurring once every $(2T_d+a)$ seconds, where $T_d$ is the time for a signal burst to travel from said slave station to the satellite and $a>0$, an associated pair of synchronizing pulses being defined as a master synchronizing pulse and a slave synchronizing pulse which occur in the same frame time; and b. synchronization loss detector means coupled to said correction rate circuit for detecting the absence of either one of an associated pair of synchronizing pulses at one of said correction times.

14. A synchronizer as defined in claim 13 wherein said synchronization loss detecting means comprises means for causing said selecting means in said correction rate circuit to search for an associated pair of synchronizing pulses in successive frame times when an associate pair of synchronizing pulses in successive frame times when an associate pair of pulses is not found at a correction time.

15. A synchronizer as defined in claim 14 wherein said synchronization loss detecting means comprises means for disabling the earth station transmitter when a predetermined number of successive frame times pass without a selection of an associated pair of master and slave synchronizing pulses.

16. In a time division multiple access orbital satellite communication system wherein plural earth stations transmit signal bursts to an orbiting satellite relay station to be relayed thereby to earth stations, each transmitting station being assigned a time slot in the satellite time frame, each station's transmission including a synchronizing signal, one of said earth transmitting stations being designated a master station and the others being designated slave stations, and each slave station including detector means for detecting master synchronizing signals and said slave station's synchronizing signals relayed from said orbiting satellite relay station to provide corresponding master and slave synchronizing pulses, respectively, the method of synchronizing a slave station with said master station comprising the steps of:

a. normally selecting at said slave station an associated pair of synchronizing pulses at correction times occurring once every $(2T_d+a)$ seconds, where $T_d$ is the time for a signal burst to travel from said slave station to the satellite and $a>0$, an associated pair of synchronizing pulses being defined as a master synchronizing pulse and a slave synchronizing pulse which occur in the same frame time;

b. comparing the phases of said associated pair of synchronizing pulses to produce an error signal indicative of the difference in phase there between; and c. controlling the time at which said slave station transmits in accordance with said error signal, and detecting the absence of either one of said associated pair of synchronizing pulses at one of said correction times.

17. The method as defined in claim 16 further comprising the step of searching for an associated pair of synchronizing pulses in successive frame times when an associated pair of pulses is not found at a correction time.

18. The method as defined in claim 17 further comprising the step of disabling the slave station's transmitter when a predetermined number of successive frame times pass without a selection of an associated pair of master and slave synchronizing pulses.

19. In a time division multiple access orbital satellite communication system wherein plural earth stations transmit signal bursts consisting of bit signals to an orbiting satellite relay station to be relayed thereby to earth stations, each transmitting station being assigned a time slot in the satellite time frame, each station's transmission including a synchronizing signal, one of said each transmitting stations being designated a master station and the others being designated slave stations, and each slave station including detector means for detecting master synchronizing signals and said slave station's synchronizing signals relayed from said orbiting satellite relay station to provide corresponding master and slave synchronizing pulses, respectively, the method of synchronizing a slave station with said master station comprising the steps of:

a. delaying a master synchronizing pulse for a time interval equal to the number of time slots between the master station's time slot and the time slot assigned to a slave station;

b. comparing the phases of said slave synchronizing pulse and said delayed master synchronizing pulse to produce an error signal indicative of the difference in phase therebetween;

c. storing the error signal;

d. initiating the transmission of a burst from said slave station once each frame time under the control of counter means; and e. changing the time of initiation of the transmission of said burst by changing the period of said counting means in accordance with said stored error signal, thereby changing said slave station's transmission time so that its burst appears in its assigned time slot.

20. The method as defined in claim 19 further comprising changing said period each frame for successive frames by an amount less than the total phase difference until said slave station's burst appears in its assigned time slot.

21. The method as defined in claim 20 further comprising changing said period one bit per frame for successive frames.

22. The method as defined in claim 19 wherein said comparing step is normally performed once every $(2T_d+a)$ seconds, where $T_d$ is the time for a signal burst to travel from said slave station to the satellite and $a$ >0, an associated pair of synchronizing pulses being defined as a master synchronizing pulse and a slave synchronizing pulse which occur in the same frame time, and further comprising detecting the absence of either a master or slave synchronizing pulse, and disabling said slave station's transmitter upon the occurrence of such an absence.